United States Patent
Whaley

(10) Patent No.: US 10,867,025 B2
(45) Date of Patent: Dec. 15, 2020

(54) OPPORTUNISTICALLY COLLECTING SENSOR DATA FROM A MOBILE DEVICE TO FACILITATE USER IDENTIFICATION

(71) Applicant: UnifyID, San Francisco, CA (US)

(72) Inventor: John C. Whaley, Fremont, CA (US)

(73) Assignee: UnifyID, Inc., San Francisco, CA (US)

(*) Notice: Subject to any disclaimer, the term of this patent is extended or adjusted under 35 U.S.C. 154(b) by 202 days.

(21) Appl. No.: 15/905,607

(22) Filed: Feb. 26, 2018

(65) Prior Publication Data

US 2018/0181741 A1 Jun. 28, 2018

Related U.S. Application Data

(63) Continuation-in-part of application No. 15/600,140, filed on May 19, 2017.

(60) Provisional application No. 62/338,663, filed on May 19, 2016, provisional application No. 62/466,230, filed on Mar. 2, 2017.

(51) Int. Cl.
| | |
|---|---|
| *G06F 21/31* | (2013.01) |
| *G06F 21/35* | (2013.01) |
| *H04L 29/06* | (2006.01) |
| *H04W 4/38* | (2018.01) |
| *G06F 21/32* | (2013.01) |
| *H04W 12/06* | (2009.01) |
| *G06K 9/00* | (2006.01) |
| *G06N 20/00* | (2019.01) |
| *H04W 12/00* | (2009.01) |

(52) U.S. Cl.
CPC ............ *G06F 21/35* (2013.01); *G06F 21/316* (2013.01); *G06F 21/32* (2013.01); *G06K 9/00348* (2013.01); *G06K 9/00885* (2013.01); *G06N 20/00* (2019.01); *H04L 63/102* (2013.01); *H04W 4/38* (2018.02); *H04W 12/06* (2013.01); *H04W 12/00505* (2019.01); *H04W 12/00508* (2019.01)

(58) Field of Classification Search
None
See application file for complete search history.

(56) References Cited

U.S. PATENT DOCUMENTS

| | | | |
|---|---|---|---|
| 8,145,561 B1* | 3/2012 | Zhu | G06Q 40/025 455/410 |
| 8,489,635 B1* | 7/2013 | Phoha | G06F 21/316 707/781 |

(Continued)

*Primary Examiner* — Jason Chiang
(74) *Attorney, Agent, or Firm* — Park, Vaughan, Fleming & Dowler LLP

(57) ABSTRACT

The inventors recently developed a system that authenticates and/or identifies a user of an electronic device based on passive factors, which do not require conscious user actions. During operation of the system, in response to a trigger event, the system collects sensor data from one or more sensors in the electronic device, wherein the sensor data includes movement-related sensor data caused by movement of the portable electronic device while the portable electronic device is in control of the user. Next, the system extracts a feature vector from the sensor data, and analyzes the feature vector to authenticate and/or identify the user. During this process, the feature vector is analyzed using a model trained with sensor data previously obtained from the portable electronic device while the user was in control of the portable electronic device.

36 Claims, 9 Drawing Sheets

(56) References Cited

U.S. PATENT DOCUMENTS

| | | | |
|---|---|---|---|
| 9,275,345 B1* | 3/2016 | Song | G06F 21/552 |
| 9,706,406 B1* | 7/2017 | Adams | H04W 12/08 |
| 10,078,743 B1* | 9/2018 | Baldi | G06N 20/00 |
| 2004/0083394 A1* | 4/2004 | Brebner | G06Q 20/382 |
| | | | 726/19 |
| 2005/0022034 A1* | 1/2005 | Chaudhari | G06F 21/32 |
| | | | 726/19 |
| 2010/0042835 A1 | 2/2010 | Lee | |
| 2010/0210242 A1* | 8/2010 | Caudevilla Laliena | H04L 63/08 |
| | | | 455/411 |
| 2014/0289833 A1* | 9/2014 | Briceno | H04L 63/08 |
| | | | 726/7 |
| 2014/0317734 A1* | 10/2014 | Valencia | G06F 21/552 |
| | | | 726/22 |
| 2014/0372762 A1* | 12/2014 | Flautner | H04L 9/3226 |
| | | | 713/173 |
| 2015/0332031 A1* | 11/2015 | Mistry | G06F 21/316 |
| | | | 726/19 |
| 2016/0050203 A1* | 2/2016 | Hefetz | H04L 63/18 |
| | | | 726/7 |
| 2016/0057623 A1* | 2/2016 | Dutt | H04W 12/06 |
| | | | 455/411 |
| 2016/0103996 A1* | 4/2016 | Salajegheh | G06F 11/3024 |
| | | | 726/25 |
| 2016/0110528 A1* | 4/2016 | Gupta | G06F 21/31 |
| | | | 726/19 |
| 2016/0180068 A1* | 6/2016 | Das | G06F 21/32 |
| | | | 726/7 |
| 2016/0182503 A1* | 6/2016 | Cheng | H04W 12/0605 |
| | | | 726/7 |
| 2016/0278664 A1 | 9/2016 | Pant | |
| 2016/0295512 A1* | 10/2016 | Hara | H04W 52/0229 |
| 2016/0330199 A1* | 11/2016 | Weiner | H04L 63/0853 |
| 2016/0342784 A1* | 11/2016 | Beveridge | H04L 67/08 |
| 2017/0289168 A1* | 10/2017 | Bar | H04L 63/0853 |
| 2018/0078179 A1* | 3/2018 | Deng | A61B 5/117 |

* cited by examiner

OPPORTUNISTICALLY COLLECTING SENSOR DATA FROM A MOBILE DEVICE TO FACILITATE USER IDENTIFICATION

CROSS-REFERENCE TO RELATED APPLICATION

This application is a continuation-in-part of, and hereby claims priority under 35 U.S.C. § 120 to, pending U.S. patent application Ser. No. 15/600,140, entitled "Identifying and Authenticating Users Based on Passive Factors Determined from Sensor Data," by inventors John C. Whaley and Kurt W. Somerville, filed 19 May 2017, the contents of which are incorporated herein by reference. U.S. patent application Ser. No. 15/600,140 itself claims priority under 35 U.S.C. § 119 to U.S. Provisional Application No. 62/338,663, entitled "Authentication and Identification System," by inventor John C. Whaley, filed on 19 May 2016, the contents of which are likewise incorporated herein by reference. This application also claims the benefit of U.S. Provisional Application Ser. No. 62/466,230, entitled "User Verification and Authentication System," by inventor John C. Whaley, filed on 2 Mar. 2017, the contents of which are incorporated by reference herein.

BACKGROUND

Field

The disclosed embodiments generally relate to techniques for identifying and authenticating users in computing systems. More specifically, the disclosed embodiments relate to techniques for opportunistically collecting sensor data from a mobile device to identify and/or authenticate the user of the mobile device while maintaining a low resource footprint.

Related Art

There presently exist a number of techniques for identifying and authenticating computer system users. At present, most techniques rely on knowledge-based factors, such as passwords. However, passwords have limitations, especially with respect to the user's experience. Human users are simply not good at creating new passwords, which include strong and unique combinations of characters that are also memorable. Furthermore, passwords are commonly phished or stolen. Moreover, the password-creation rules that websites and services enforce are ever-changing and growing increasingly more complex. To keep up with this complexity, users often reuse passwords across multiple services, or make only small, predictable changes among passwords for different services. Also, because passwords are hard to remember, users often write them down or store them in a file for easy access, which also makes them easier to steal. Some users employ password managers to handle all of their passwords. However, password managers reduce security by creating a single point of failure.

Some systems rely on a two-factor authentication technique, which requires a user to carry an extra device to authenticate. However, this can be burdensome to the user because the device can be forgotten, run out of power, or break.

Other systems authenticate a user based on biometric factors, such as fingerprints. However, it is often inconvenient to use such systems, and they can require specialized hardware. Moreover, it is very difficult (or impossible) to alter a biometric signature in case it is compromised.

Hence, what is needed is a technique for identifying and authenticating users of computing systems without drawbacks of the above-described existing techniques.

SUMMARY

The inventors recently developed a system that authenticates and/or identifies a user of an electronic device based on passive factors, which do not require conscious user actions. During operation of the system, in response to a trigger event, the system collects sensor data from one or more sensors in the electronic device, wherein the sensor data includes movement-related sensor data caused by movement of the portable electronic device while the portable electronic device is in control of the user. Next, the system extracts a feature vector from the sensor data, and analyzes the feature vector to authenticate and/or identify the user. During this process, the feature vector is analyzed using a model trained with sensor data previously obtained from the portable electronic device while the user was in control of the portable electronic device.

In some embodiments, the movement-related sensor data includes accelerometer data gathered while the user is walking, wherein the accelerometer data reflects a characteristic gait of the user while walking.

In order to operate effectively, the system must carefully determine when to trigger collection of the sensor data. If the system collects sensor data too frequently, power is unnecessarily consumed during the collection process, which shortens battery life for the portable electronic device. Also, valuable network bandwidth can be wasted while transferring the sensor data to a server that analyzes the sensor data.

To address this problem, the disclosed embodiments provide a system that opportunistically triggers collection of sensor data while maintaining a low resource footprint.

In some embodiments, the trigger event comprises a silent push notification received by the portable electronic device.

In some embodiments, the trigger event comprises a notification received by the portable electronic device from a wireless beacon.

In some embodiments, the trigger event comprises a periodic notification, which is sent at a predefined interval.

In some embodiments, the trigger event comprises an adaptive notification, which is sent at a variable interval determined based on feedback generated by a learner, which processes the collected sensor data. This feedback can relate to one or more of the following: a change in confidence level for the identity of the user; a battery level for the portable electronic device; a usage pattern for the portable electronic device; and a received notification associated with the portable electronic device.

In some embodiments, the trigger event comprises a detected activity of the user determined from the collected sensor data.

In some embodiments, the trigger event comprises a notification that the portable electronic device has entered or exited a predefined region associated with a geofence.

In some embodiments, the trigger event comprises one or more of the following: a change in lighting; a change in sound; a change in magnetic field; a detected keyword; a detected near-field communication (NFC) signal; a received message notification; a received telephone call; a user-interaction event associated with the portable electronic device; an interaction event between the portable electronic device and an external device/sensor; a screen-on event; a screen-off event; a device-unlock event; a device-unlock failure; an application-opening event; a switching-to-an-application event; a switching-cell-towers event; an install-application event; an uninstall-application event; a change in a device setting; a screen brightness adjustment; and a photograph-taking event.

In some embodiments, the one or more sensors include one or more of the following: an accelerometer; a touchscreen; a gyroscope; an inertial sensor; an ambient light sensor; an image sensor; a camera; an odor sensor; a temperature sensor; a barometric-pressure sensor; a cellular radio signal strength sensor; a Bluetooth radio signal strength sensor; a near-field communication (NFC) sensor; a network-proximity sensor; an infrared sensor; a magnetometer; a battery sensor; a force-touch measurement sensor; a multi-touch measurement sensor; a sensor in a mouse; a sensor in a trackpad; and a keyboard-timing sensor.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
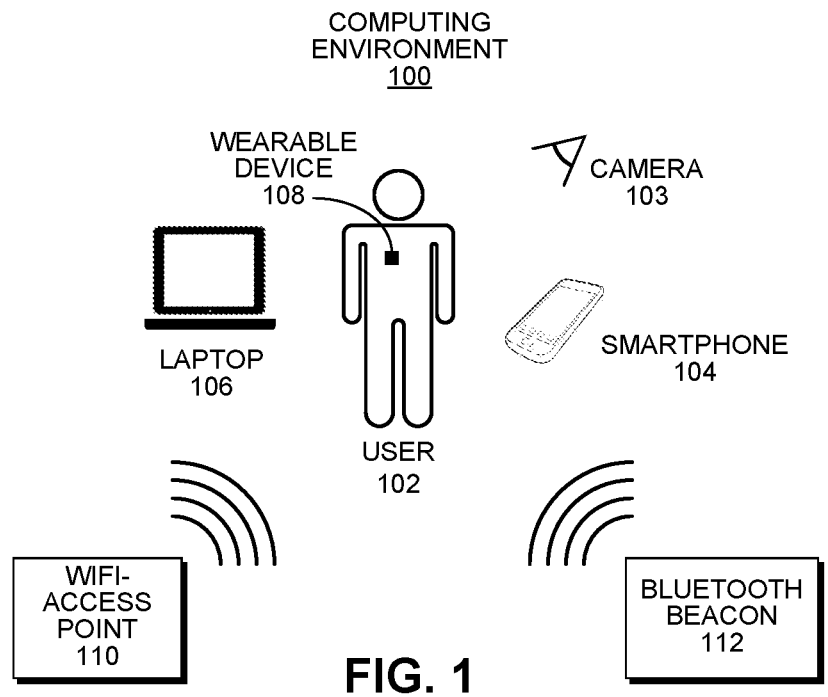
FIG. 1 illustrates various computing devices and sensors in the vicinity of a user in accordance with the disclosed embodiments.

FIG. 1 illustrates various computing devices and associated sensors that comprise a computing environment 100 for a user 102 in accordance with the disclosed embodiments. As illustrated in FIG. 1, the computing environment 100 surrounding user 102 includes a number of portable computing devices, such as a smartphone 104, or a wearable device 108, such as a fitness tracker or a smartwatch. The user 102 may also be operating a laptop computer 106 or possibly a desktop computer (not shown).

These computing devices typically include sensors that can be used to uniquely identify the user, or verify that an action is legitimately performed by the user. For example, mobile devices, such as smartphone 104, wearable device 108, a tablet computer or other personal electronic device, include sensors such as: a touchscreen; an accelerometer; a gyroscope; an inertial sensor; a virtual keyboard-timing sensor; an ambient light sensor; a camera; an odor sensor; a temperature sensor; a barometric-pressure sensor; a cellular radio signal strength sensor; a Bluetooth radio signal strength sensor; a near-field communication (NFC) sensor; an infrared sensor; a battery sensor; a force-touch measurement sensor; a multi-touch measurement sensor; and a microphone. (Note that instead of using a microphone to collect sound and voice, sound and voice can alternatively be captured using motion sensors, such as an accelerometer or a gyroscope.) Laptop computer 106 or a desktop computer may include sensors, such as: a keyboard-timing sensor; a mouse sensor; a trackpad sensor; a Bluetooth radio signal strength sensor; an image sensor or camera; a network proximity sensor; an infrared sensor; and a battery sensor.

Computing environment 100 can include other devices with sensors, which are located in, on or near a person's body, including: medical indigestibles, subdermal implants, electronic tattoos, smart clothing or accessories, and physical authentication devices.

In addition, computing environment 100 can include other devices in the vicinity of user 102 having sensors and network connectivity, such as: a camera 103, a Wi-Fi® access point 110, a Bluetooth™ beacon 112, a home thermostat, automobile components, security systems, televisions and other entertainment devices, and IoT (Internet of Things) devices.

Note that the sensors can also provide side-channel information gleaned from measurements not necessarily designed to directly measure the element in question, such as: an accelerometer; a gyroscope; an ambient light sensor; a magnetometer; a barometer; a proximity sensor; a thermometer; and an image sensor.

Moreover, the data obtained from the sensors can be related to the interaction of multiple devices, such as: (1) the presence of different devices within wireless range or on the same local network; (2) the relative signal strength, noise, packet loss, bandwidth readings, or other statistics among multiple devices, or between a mobile device such as a mobile phone and a fixed device such as a wireless access point; (3) a combination of audio data from multiple microphones that measure ambient noise; (4) audio signals generated by playing sounds on speakers and listening for those sounds or echoes of those sounds on nearby microphones; (5) signals obtained by recording ambient light data from multiple light sensors; and (6) signals that indicate when a device is attached/paired with another device, or comes into range or communication with the other device (or when a device is detached/unpaired or goes out of range).

Also, data obtained from sensors can include semantic information about the usage of a service, such as: (1) a specific sequence of interactions with the service and the timings between the interactions; (2) when there exist multiple ways to perform a task, the particular user flow used to perform the task; (3) mistakes, typos, or misclicks, or other operations that are typically ignored by the service; (4) metadata about specific interactions, such as what part of a button or screen element was clicked, or readings from other sensors before, during, or after a significant event; and (5) responses and changes in user behavior due to perceptible or imperceptible changes in how a service is rendered or results are presented.

Exemplary Authentication Process

Prior to the authentication process taking place, the user performs a number of initialization operations, such as installing software agents on the user's devices, and importing password data from a password-management system. Next, the system learns familiar user behaviors based on information obtained from the user's devices over time to produce one or more models of the user's behaviors. After these initialization operations are complete, the system is ready to perform the authentication process.

Figure 2:
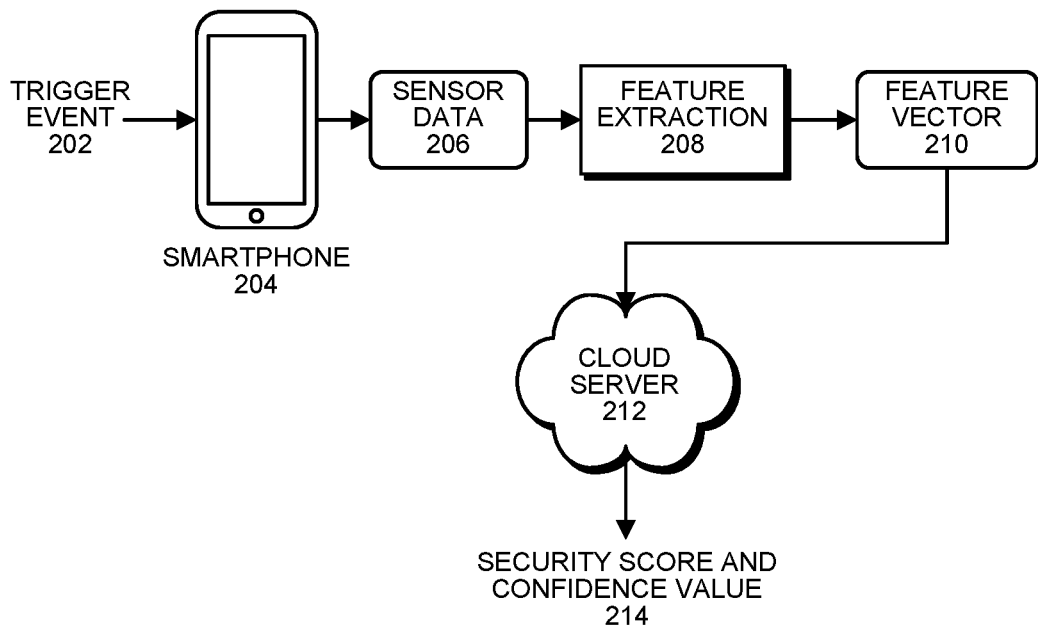
FIG. 2 illustrates an authentication process in accordance with the disclosed embodiments.

Next, as illustrated by the example in FIG. 2, the system performs the authentication process. As shown in FIG. 2, during operation of a smartphone 204, a trigger event 202 occurs, which causes an agent running on smartphone 204 to collect sensor data 206. Next, the smartphone 204 performs a feature-extraction operation 208 on the sensor data 206 to produce a feature vector 210, which is communicated to a cloud server 212. Cloud server 212 then uses a model generated through a machine-learning process to determine a security score and associated confidence value 214 for a user, wherein the security score indicates a probability that the sensor data 206 is associated with the user.

Authentication System

Figure 3:
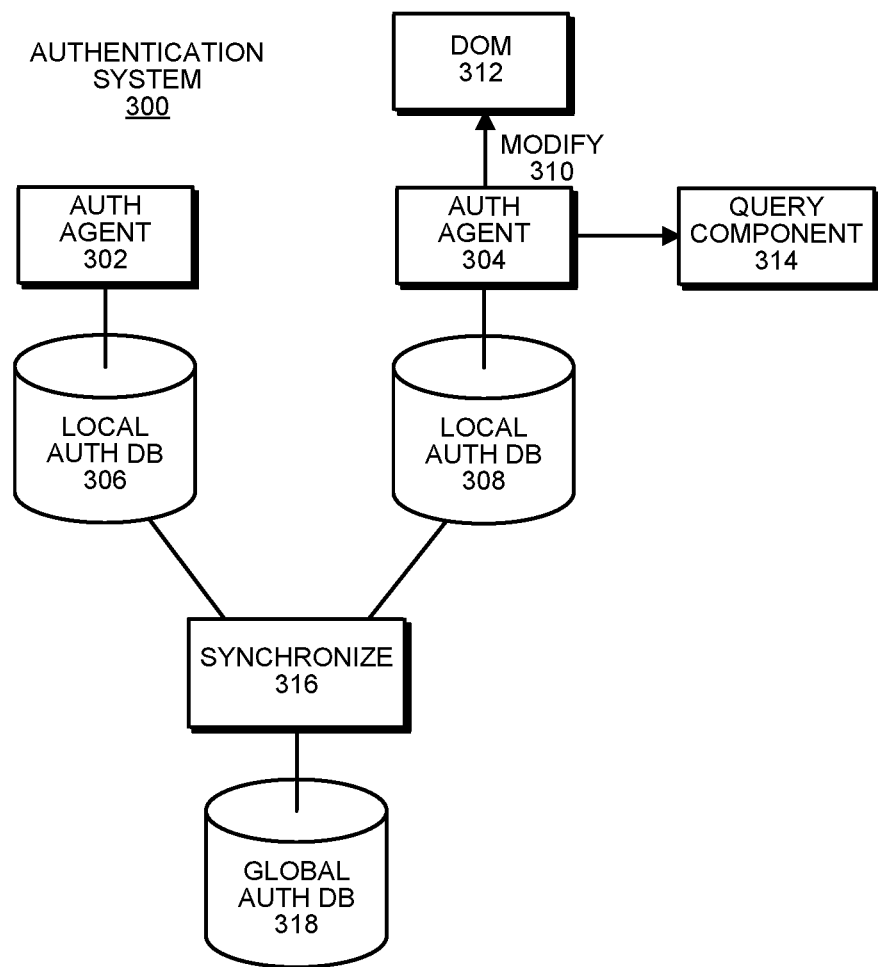
FIG. 3 illustrates how authentication agents interact with the authentication system in accordance with the disclosed embodiments.

FIG. 3 illustrates how authentication agents 302 and 304 operate in an exemplary authentication system 300 in accordance with the disclosed embodiments. Within authentication system 300, authentication agents 302 and 304 are responsible for handling integration with authentication mechanisms on various sites and services. In some embodiments, authentication agents 302 and 304 are implemented as browser plugins that control user-authentication operations that take place in associated web browsers.

For example, an authentication agent 304 in a login system can perform operations, such as modifying a document object model (DOM), structure, or the look/styling of a web page, service, application, or user interface to add new login mechanisms, or to modify existing login mechanisms to facilitate automated authentication and login processes as is described in more detail below. These operations can involve: automatically interacting with user-interface elements; automatically filling in credentials; and interfacing directly with existing authentication mechanisms and interfaces. While performing these operations, authentication agent 304 can optionally hide authentication-related elements, such as usernames, passwords, forgotten-password links, and other elements so as to allow the user authentication operation to proceed without involving explicit user action.

Authentication agents 302 and 304 can also analyze the security of a user's profile and suggest actions for increasing security. For example, while analyzing a user's security profile, an authentication agent can consider: (1) the strength of the user's password with respect to dictionaries, known password leaks, password reuse, and complexity measurements; (2) an amount of information that is known about a user's behavior or environment; (3) how unique a user's behavior and environment are in comparison to those of other users; (4) the security of the user's friends or contacts; (5) the number and variety of devices that a user has registered; and (6) how many active factors have been registered for the user.

Authentication agents 302 and 304 can also enable the user to provide additional information about themselves or their devices. For example, the user can disclose familiar devices by performing: a network probe; a Bluetooth scan; an account sync; and a device-to-device sync. The user can also answer questions about themselves, and can explicitly register devices, biometrics, or any other information that will be used to respond to active or passive challenges.

The authentication agent can also use hints to discover when a device is being used by a different user, such as looking at when the user logs in to a different account, and looking for anomalous access patterns. Note that the system can possibly allow a user to authorize the use of their device(s) by one or more alternative users, which involves: ceasing collection of data for the main user; and synchronizing the alternative user's sampled data across all of the main user's accounts.

While performing authentication operations, authentication agents 302 and 304 communicate with local authentication database instances 306 and 308, respectively, which store credentials, usernames, passwords, secrets, cookies, tokens, and other secure items required for authentication. In the embodiment of the system illustrated in FIG. 3, there exists one instance of a local authentication database for each instance of an authentication agent. Moreover, the data in local authentication databases 306 and 308 can be synchronized by a synchronization module 316, so that local copies of the data are consistent with a master copy of the data stored in a global authentication database 318. For example, this synchronization process enables an encrypted password state to be synchronized across multiple devices.

Processing Sensor Data

Figure 4:
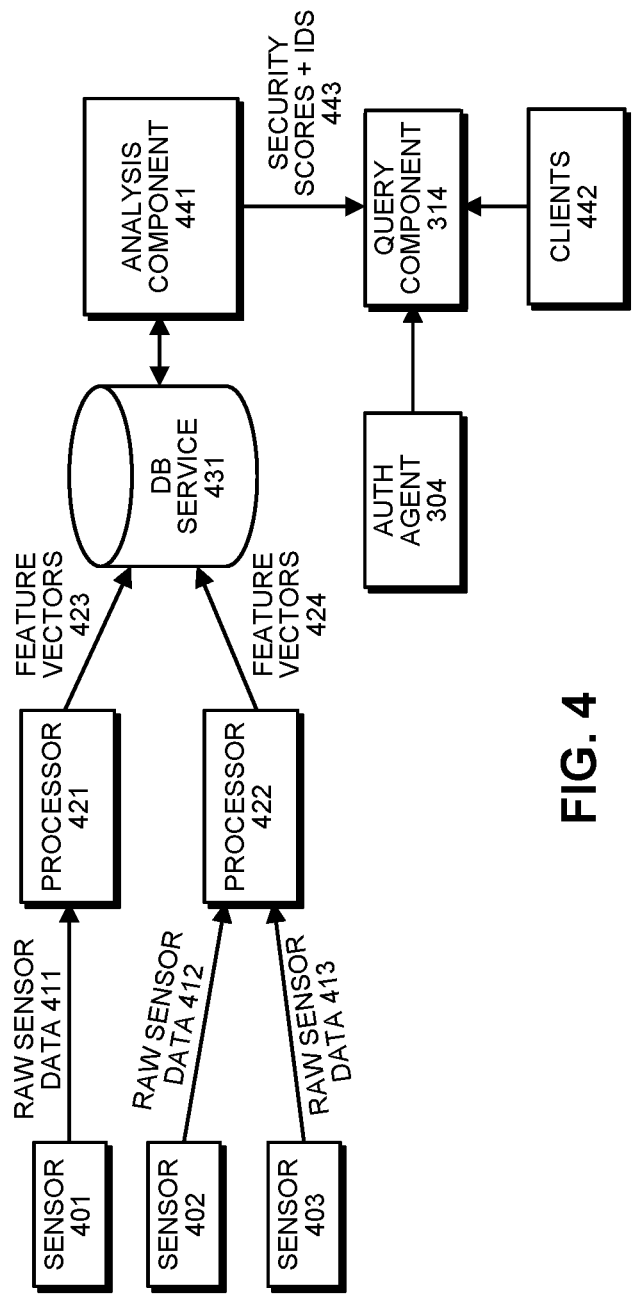
FIG. 4 illustrates how data is processed by the authentication system in accordance with the disclosed embodiments.

FIG. 4 illustrates how sensor data is processed by the authentication system in accordance with the disclosed embodiments. As illustrated in FIG. 4, the authentication system provides a query component 314 for its clients, such as authentication agent 304 and other clients 442, to query for purposes of verifying identity. Authentication agent 304 and other clients 442 can access query component 314 to verify a user's identity for a number of reasons, including logging on, checking out, and performing other secure actions.

During operation of the system illustrated in FIG. 4, sensors 401-403 collect raw sensor data 411-413 associated with a user's behavior, actions, and/or environment. Then, processors 421-422 perform signal-processing operations and other techniques on raw sensor data 411-413 to extract feature vectors. Note that processors 421-422 can be incorporated into a sensor, or can reside on a local device near the sensor, or on an entirely separate device.

Moreover, the signal-processing operations performed by processors 421-422 can include: filtering operations; conversions among the time, space and frequency domains; Fourier transforms; Butterworth filters, Z-plane analysis operations, wavelet transforms, or other operations to extract information from signals. Also, note that feature vectors 423-424 can include timestamps associated with specific sensor data collected on a per-sensor basis. Processors 421-422 can also extract encryption key bits from biometric/behavioral factors, and can combine them with other bits to form encryption keys that can be used to decrypt sensitive data. Next, processors 421-422 buffer feature vectors 423-424 and send them to database service 431, which aggregates and stores feature vectors obtained from multiple processors.

Analysis component 441 then queries database service 431 to obtain feature vectors 423-424, and performs various analysis and machine-learning operations to correlate the data and generate one or more security scores and associated identifiers 443.

Analysis component 441 uses prior data about a user obtained from database service 431 to build one or more models for the user. During this model-building process, the system can focus on characteristics of specific user behaviors to uniquely identify a user. For example, the system can examine accelerometers readings (or other sensor readings), which indicate how a user: walks, stands up, sits down, talks or types. The system can also focus on how a user manipulates her phone. One promising way to authenticate a user is to recognize the user based on accelerometer readings indicating characteristics of the user's gait while the user is walking. In fact, it is possible to recognize a specific user based on just the magnitude of the accelerometer data, and not the direction of the accelerations. The system can also consider combinations of factors from different sensors instead of merely considering a single factor. This includes considering cross-device factors, such as signal strength between a wearable device and a user's smartphone, or a combination of accelerometer readings from the wearable device and the smartphone.

The system can also attempt to detect the presence of another person, for example by looking for a Bluetooth signal from the other person's smartphone, and can condition the recognition process based on the presence or absence of the other person. This can be useful because the presence of another person may change the user's behavior.

Next, while processing the feature vectors, analysis component 441 can generate one or more possible user identities with an associated security score for each identity. Note that the system illustrated in FIG. 4 can also include a "challenge channel" (not shown) to deliver challenges to a device or a user as is discussed in more detail below.

Authentication agent 304 and other clients 442 can then connect to the query component 314 to retrieve the security score 443 for a user from analysis component 441. Query component 314 can also be used by clients to query and verify user identities continuously throughout the usage of their service. Also, instead of merely identifying and authenticating a specific user, the system can potentially be used to determine whether a user's smartphone has been stolen, or borrowed, or if another user is trying to log into a user's device on behalf of the user.

Authentication Process

Figure 5:
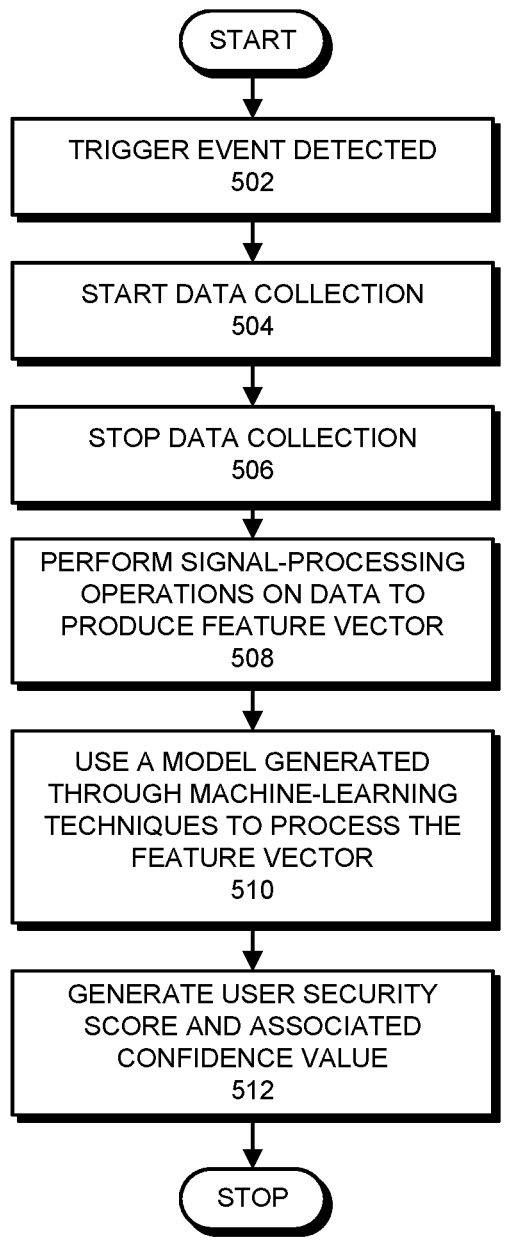
FIG. 5 presents a flow chart illustrating operations involved in the authentication process in accordance with the disclosed embodiments.

FIG. 5 presents a flow chart illustrating operations involved in the authentication process in accordance with the disclosed embodiments. First, the system detects a trigger event (step 502). As mentioned above, this trigger event can involve: detecting an activity of the user (such as detecting whether the user is walking, stationary, or driving a car); a state change associated in an electronic device belonging to a user (such as a smartphone waking up, changing its charging state, going in and out of range of a wireless access point, or moving a certain distance); a timer-based trigger; and a broadcast trigger received by the electronic device.

In response to detecting the trigger event, the system starts data collection (step 504) and sometime later stops data collection (step 506). (Note that in some embodiments, data collection does not necessarily stop before the data is processed. It can be processed in a streaming manner (or in chunks) while the data is still being collected.) Then, the system performs signal-processing operations on the data to produce a feature vector (step 508). The system then uses a model generated using machine-learning techniques (such as a neural network) to process the feature vector (step 510). Note that the system may generate a number of models for each user, wherein each model is associated with a specific behavior, such as walking, standing up or sitting down. The system can also generate a "universal background model," which ideally includes characteristics for the entire human race, and can determine how the user fits into the universal background model. In particular, the system can use the universal background model to identify "similar people" who exhibit characteristics, which are closest to the user, and can construct synthetic training data to train the model to discriminate between the user and the similar people.

Finally, the system generates a security score for the user along with an associated confidence value (step 512). Note that while determining the security score, the system can generate a "generalized product of experts." For example, the system can include a collection of experts, such as an expert that determines whether sensor data matches a user's gait, and another expert that determines a user's location. The system can then use inputs from all of these experts to generate the security score.

Figure 6:
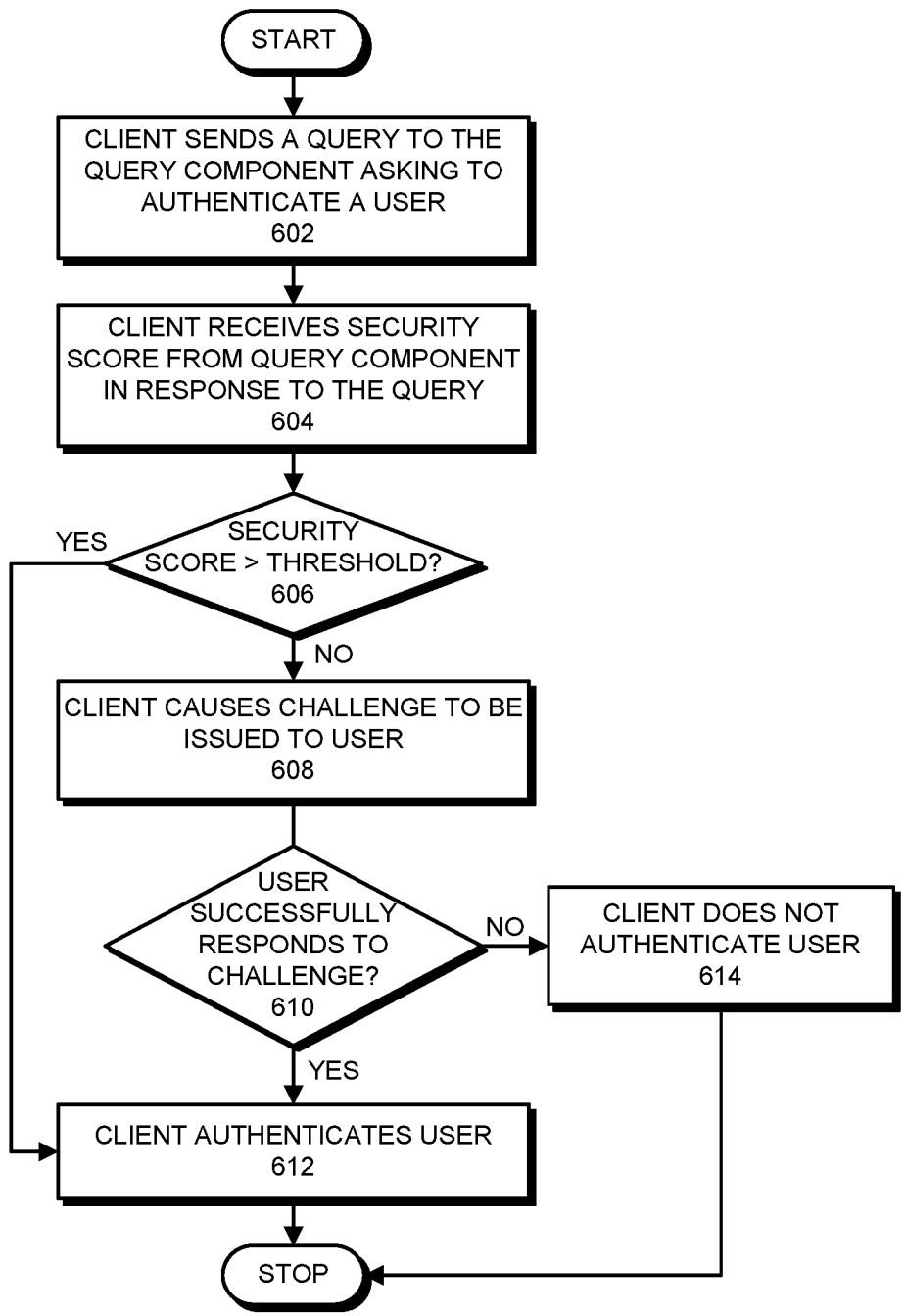
FIG. 6 presents a flow chart illustrating operations a client performs during the authentication process in accordance with the disclosed embodiments.

FIG. 6 presents a flow chart illustrating operations a client performs during the authentication process in accordance with the disclosed embodiments. First, the client sends a query to the query component asking to authenticate a user (step 602). The client then receives a security score from the query component in response to the query (step 604). Then, the system determines whether the security score is greater than a threshold (step 606). (Note that the threshold can be different for different services and actions.) If the security score is greater than the threshold (YES at step 606), the client authenticates the user (step 612). In some embodiments, this may involve combining a cryptographically signed response received from the query component with local cryptographic data to perform the authentication operation.

In some embodiments, instead of using the security score for an authentication decision, the security score is used to detect fraud. In these embodiments, the security score is fed to a fraud/risk engine, which makes a determination about whether an interaction may be fraudulent, and if so performs some action, such as: blocking the transaction; flagging the transaction as potentially fraudulent; or logging the transaction to be investigated at a later time.

Otherwise, if the security score is not greater than the threshold (NO at step 606), the client causes a challenge to be issued to the user (step 608) either on the same device or on a different device. The challenge can be an "active challenge" that requires the user to perform some action, or a "passive challenge" that happens unbeknownst to the user and requires the system to obtain more-detailed sensor data or perform more-sophisticated processing of the sensor data.

A challenge can involve asking the user about a knowledge-based factor, such as asking the user to: provide a password or PIN; answer a security question; identify friends in photos; answer a question about where the user was at a particular time/date, or who was with the user, optionally with photos. A knowledge-based factor can also involve asking a user: if they took a particular photo; about credit card charges or payment activity; about emails, text messages, or other communications; about information from their social media profiles or their résumé; to identify an item in a picture; or about the user's habits, behavior, or history. Responding to a challenge can also involve using biometrics to provide authentication, which may involve obtaining: a fingerprint or other biometric reading; facial recognition; an image of the user or user's surroundings taken by a device's camera; and a voiceprint.

Responding to a challenge can also involve using additional factors to authenticate, including: a text message/email/voice call; a challenge/response to a phone app; a photo ID (holding the user's license in front of a camera); a USB unlock key; a YubiKey; a U2F key; another device with a unique ID; a one-time-use unlock code; or an NFC "bump" between a wearable device and a mobile device.

The user can also use unique behaviors to authenticate, including: signing the user's name; saying a phrase; drawing a pattern; performing a personalized motion in front of a motion-capture device; and singing or whistling.

Then, the system determines whether the user successfully responded to the challenge (step 610). If so (YES at step 610), the client authenticates the user (step 612). Otherwise, if the user does not successfully respond to the challenge (NO at step 610), the client does not authenticate the user (step 614). Also, if the security score of a user drops below or goes above the threshold, the query component can actively push notifications about the change to registered clients.

Triggering Collection of Sensor Data

The disclosed embodiments provide a system that continually determines the identity of a user through sensor data gathered from one or more devices associated with the user. During operation, the system opportunistically collects sensor data from the devices associated with the user while maintaining a low resource footprint, wherein the sensor data is processed to facilitate verification and authentication of an identity of the user. In this way, the system can determine whether the registered user of a device is the one currently using the device, without significantly impacting battery life on battery-powered devices, such as smartphones, wearable devices, laptops, and Internet of Things (IoT) devices.

To achieve this result, the system carefully controls when and what kind of data is collected. Some of the associated techniques for triggering data collection on portable devices include the following.

Periodic silent push notifications (at constant or variable intervals) to "wake up" data collection on mobile devices.

Data collection triggered by activity detection (walking, running, cycling, driving, stationarity, etc.) on mobile devices.

Making the user's personal computer a wireless beacon such as a Bluetooth™ beacon, or using a third-party beacon, to wake up nearby smartphones and wearable devices for data collection, based on techniques including going in and out of signal range, or by broadcasting specific services.

Using geofencing to trigger data collection when the user enters or exits a location.

Using events from a light/proximity detector to trigger data collection when the light changes, for example, when a smartphone moves in or out of a pocket.

Triggering data collection based on sound changes, by listening on a microphone for noise variations.

Triggering data collection on voice or keyword matching.

Collecting data in the background while playing a background sound, including silence or soft white noise.

Sending VoIP packets to wake up an application for data collection or for data processing purposes.

Periodically notifying the user to launch an app in the foreground to reset the background execution count.

Activating an app for data collection based on changes of magnetic fields.

Collecting data based on NFC signals.

Listening for message notifications, such as Instant Messaging (IM), SMS or email to wake an app.

Waiting for phone calls to be received to wake an app for data collection.

Observing user interaction events, such as: touch events; pressing of buttons such as volume and navigation buttons; cursor hovering; 3D touch events; opening/closing a physical or virtual keyboard or other input/output device; going in and out of range of a signal; plugging or unplugging a device.

Observing interactions with a car or a house, or sensing devices, such as cameras, microphones, proximity sensors, motion detectors, pressure plates or sensors, smart lights or infrared (IR) devices.

Silent Push Notifications

The system can periodically send a silent push notification to a mobile device to wake up an app running in the background to collect data. This can be done in a variety of ways, including: at constant intervals, or at variable intervals or random intervals, and can also be triggered by other events or sensor data. Note that the triggering rate can also be adaptively changed based on which notifications have been received or processed, battery life, radio state, and other factors.

Figure 7A:
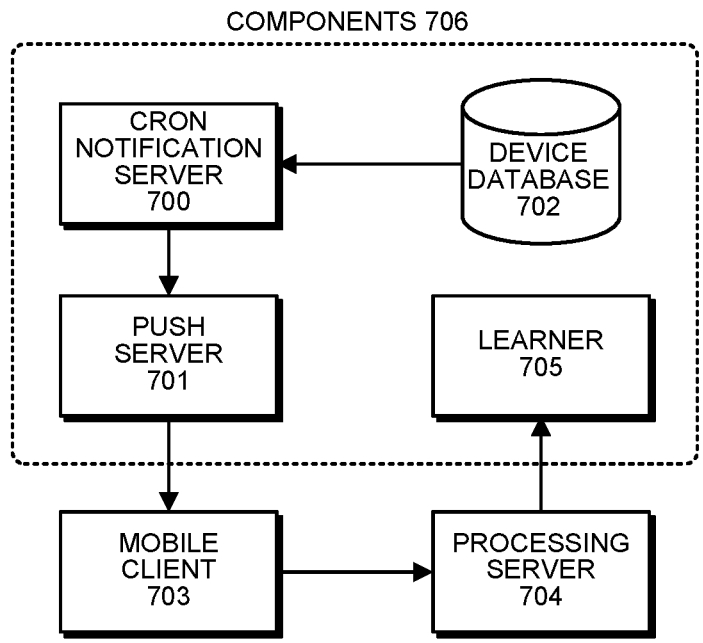
FIG. 7A illustrates a system that uses a cron-based silent push notification to trigger collection of sensor data in accordance with the disclosed embodiments.

For example, FIG. 7A illustrates an exemplary system that uses a cron-based silent push notification to trigger collection of sensor data in accordance with the disclosed embodiments. As illustrated in FIG. 7A, this system includes cron notification server 700, which sends notifications at constant, predefined intervals (for example every 5 minutes) to a push server 701, which forwards the notification to a mobile client 103. Note that push server 701 can be owned and operated by a service provider, such as Apple if the mobile client is an iOS™ device, or Google if the mobile client is an Android™ device. Note that push server 701 acts as a proxy to send out silent push notifications to mobile devices, wearable devices or other Internet-connected devices, such as IoT devices.

During operation, cron notification server 700 accesses device database 702, which includes tables for keeping track of each user and what devices are registered to each user, wherein every device is referenced by a device ID. The identifier that the push server 701 needs to send push notifications to is also stored in the device database 702.

Mobile client 703 also includes functionality for enabling or disabling data-collecting components, which can get triggered remotely or locally. In this case, it is triggered by the silent push notification. Mobile client 703 can be running on a portable device, such as a mobile phone, or any other smart device, including stationary sensors or cameras.

Sensor data from mobile client 703 feeds into a processing server 704, which performs real-time or batch processing on the sensor data. Note that processing server 704 can run on a mobile device, or any other Internet-connected or smart device. It can also run remotely in the cloud or in a data center. (In general, any of the set of components 706 can be run, in whole or in part, on cloud services, or remote servers.)

The processed sensor data is sent to a learner 705, which uses the sensor data to learn about the device and the user implicitly. Note that learner 705 can run on a mobile device, or any other Internet-connected or smart device. It can also run remotely in the cloud or in a data center.

Figure 7B:
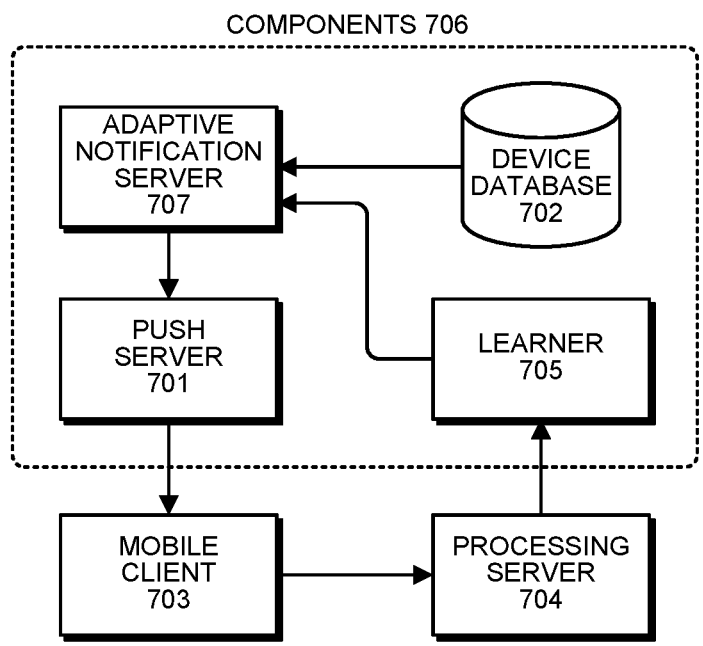
FIG. 7B illustrates a system that uses an adaptive notification server to trigger collection of sensor data in accordance with the disclosed embodiments.

FIG. 7B illustrates a variation of the system illustrated in FIG. 7A that uses an adaptive notification server 707 to trigger collection of sensor data in accordance with the disclosed embodiments. During operation, adaptive notification server 707 requests sensor data from mobile client 703 at variable intervals, based on previous feedback from the learner 105. It requests more data when necessary (for example when there is less information about the user, or when the identification confidence level drops), and less data when data is not needed (for example, when the user is asleep and is not generating useful data). Adaptive notification server 707 can also adjust notification intervals based on other types of factors, including battery level data, usage pattern data, Wi-Fi data, cellular communication data, or received notifications.

Data Collection Triggered by Activity Detection

Many mobile-programming APIs (such as iOS™ and Android™) can trigger code execution when a user activity is detected. The detected activity can include, but is not limited to: walking, running, cycling, driving, sitting, being stationary, or an unknown activity. The data collection can be triggered in the background, when any change of activity is detected other than being stationary.

Figure 8A:
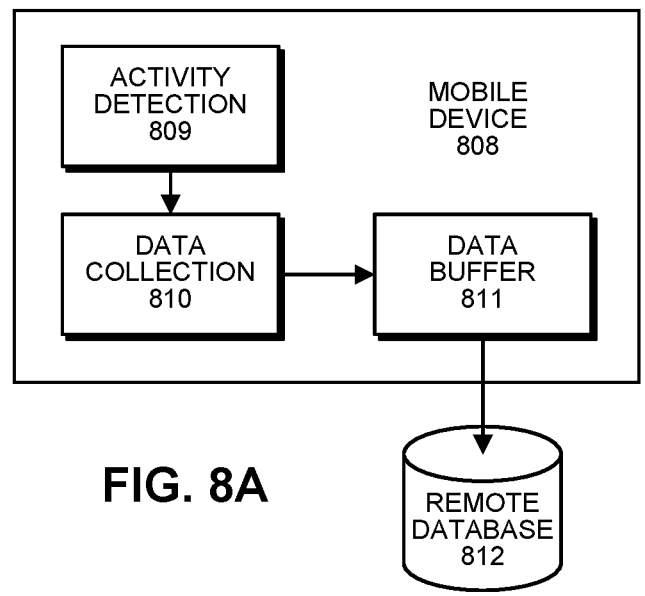
FIG. 8A illustrates a system that triggers collection of sensor data based on activity detection in accordance with the disclosed embodiments.

For example, FIG. 8A illustrates an exemplary system that triggers collection of sensor data based on activity detection in accordance with the disclosed embodiments. The system in FIG. 8A includes a mobile device 808, which can include: a smartphone, an IoT device, or any other device capable of collecting sensor data.

As illustrated in FIG. 8A, mobile device 808 includes an activity detection module 809, a data collection module 810 and a data buffer 811. Activity detection module 809 can be implemented using an activity-detection application programming interface (API), as is provided by iOS™ or Android™ and possibly from other libraries for developing mobile devices, wearable devices, smart devices, or any other Internet-connected devices that can collect sensor data. For example, the CoreActivity™ API for iOS™ and the ActivityManager™ API for Android™ can be used to trigger code execution when there is an activity change.

Data collection module 810 can be implemented using a data-collection daemon, which for example can collect: accelerometer data, gyroscope data, magnetometer data, GPS data, Bluetooth network data, Wi-Fi network data, keystroke data, light sensor data, sound sensor data, NFC data, humidity data or any other kind of sensor data. The collected sensor data is temporarily stored in data buffer 811, from which it is uploaded onto a remote database 812 or datastore for further processing. Data buffer 811 can be implemented using a two-level cache, wherein the first level is stored in volatile memory, and the second level can be stored in persistent storage, if it is available. After buffering, the data is uploaded to remote database 812, which holds the sensor data for subsequent processing.

Data Collection Based on a Beacon Signal

Figure 8B:
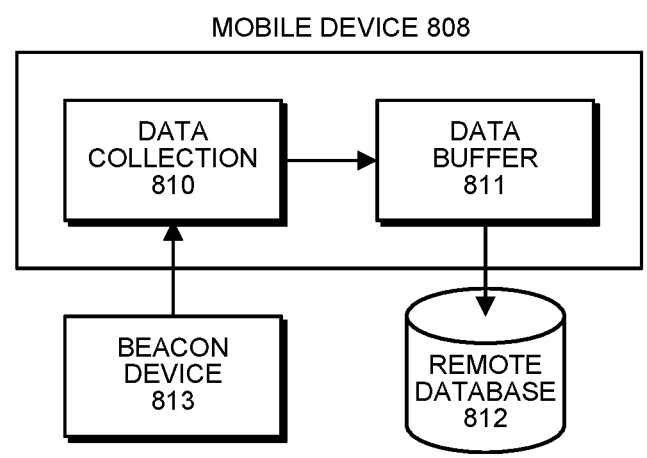
FIG. 8B illustrates a system that uses a beacon device to trigger collection of sensor data in accordance with the disclosed embodiments.

Some embodiments make use of use a multi-device approach, which allows us to use an electronic device, such as a personal computer, mobile device, laptop, console or any other personal Internet-connected, wireless-enabled device, as a beacon. We refer to such as device as a "beacon device" 813 as is illustrated in FIG. 8B. During operation, a signal from beacon device 813 periodically wakes up an app on mobile device 808 through a wake-up-on-Bluetooth function, a wake-up-on-NFC function, a wake-up-on-Wi-Fi function, a wake-up-on-Infrared function, or any other wireless-signal-based function that can be used to wake up the application for data collection.

We assume the mobile device 808 and the beacon device 813 have been previously paired during system setup. A native application running on beacon device 813 keeps scanning for wireless-enabled devices periodically, until an identifier for a mobile device 808 shows up. Then, beacon device 813 periodically sends a wireless message to wake up data collection module 810 on mobile device 808 to gather sensor data.

Figure 8C:
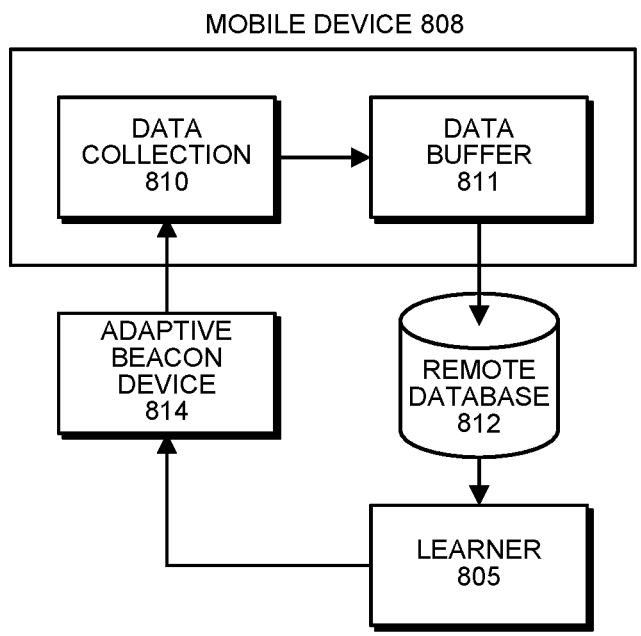
FIG. 8C illustrates a system that uses an active beacon device to trigger collection of sensor data based on feedback from a learner in accordance with the disclosed embodiments.

FIG. 8C illustrates a variation of the system in FIG. 8B, wherein beacon device 813 is replaced with an adaptive beacon device 814. During operation, a native application running on adaptive beacon device 814 keeps scanning for known wireless-enabled devices, until a known device is discovered. Then, adaptive beacon device 814 triggers sensor data collection by sending messages to mobile device 808 at variable intervals, based on feedback previously received from learner 805, which analyzes sensor data from remote database 812. It requests more data when necessary (for example, when we have less information about the user and want to know more) and less when data is not needed (for example, when the user is asleep and is not generating useful data).

Figure 8D:
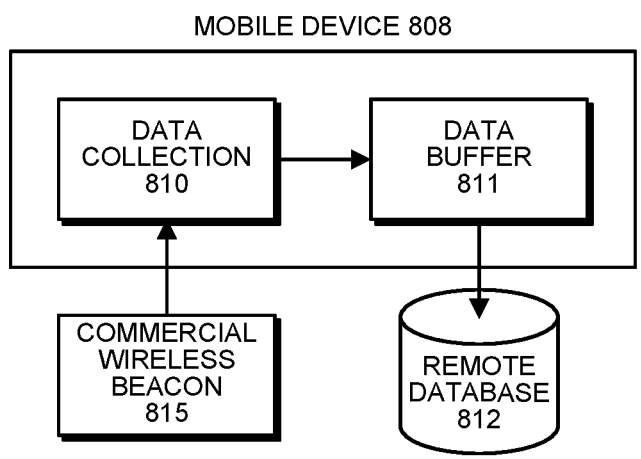
FIG. 8D illustrates a system that uses a commercial wireless beacon to trigger collection of sensor data in accordance with the disclosed embodiments.

Commercial beacons, such as Bluetooth, Wi-Fi, NFC, IR or other wireless technology beacons are becoming more widespread, and can be used to send wireless messages, such as advertisements, to mobile devices, wearable devices, and other wireless-enabled devices. As illustrated in FIG. 8D, when such wireless messages, which are sent by a commercial wireless beacon 815, are received at mobile device 808 they can trigger data collection module 810 to collect sensor data, which is stored in data buffer 811 and is subsequently uploaded into remote database 812.

Data Collection Based on Geofencing

Figure 8E:
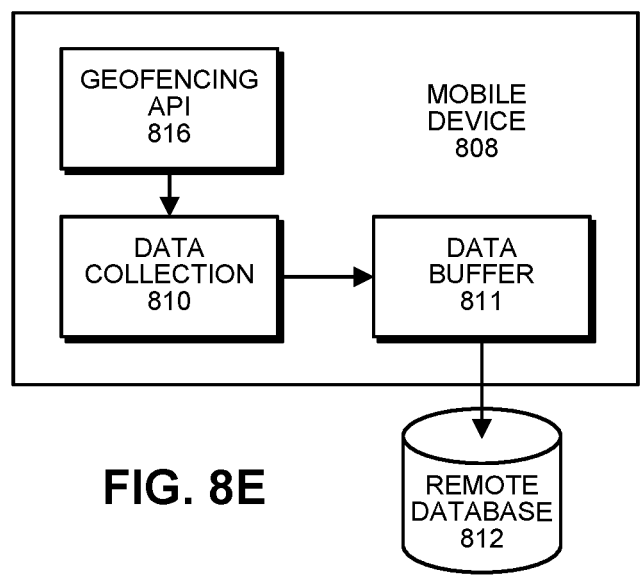
FIG. 8E illustrates a system that triggers collection of sensor data using a geofencing API in accordance with the disclosed embodiments.

Many mobile devices provide a geofencing API. By using such an API, the system can trigger sensor data collection and uploading when the mobile device enters a specific geographical area, like a user's home or workplace, or alternatively a store, a museum or any other specified area. For example, FIG. 8E illustrates how a geofencing API 816, which is available in many mobile devices, can be used to trigger data collection module 810 when mobile device 808 enters a predefined location. The location of mobile device 808 can be determined using: the GPS sensor running on mobile device 808, IP-based geolocation, or any other method of detecting geographical location or proximity to a location.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for authenticating and/or identifying a user of a portable electronic device, comprising:
   in response to a trigger event, collecting sensor data from one or more sensors in the portable electronic device, wherein the sensor data includes movement-related sensor data caused by movement of the portable electronic device while the portable electronic device is in control of the user;
   extracting a feature vector from the sensor data;
   analyzing the feature vector using a model trained with sensor data previously obtained from the portable electronic device while the user was in control of the portable electronic device;
   generating an associated security score for each of multiple authorized users of the device, based on said analysis of the feature vector; and
   identifying the user based on the security scores;
   wherein the trigger event comprises an adaptive notification sent at a variable interval determined based on feedback generated by a learner that processes the collected sensor data.

2. The method of claim 1,
   wherein the movement-related sensor data includes accelerometer data gathered while the user is walking; and
   wherein the accelerometer data reflects a characteristic gait of the user while walking.

3. The method of claim 1, wherein the trigger event comprises a silent push notification received by the portable electronic device.

4. The method of claim 1, wherein the trigger event comprises a notification received by the portable electronic device from a wireless beacon.

5. The method of claim 1, wherein the trigger event comprises a periodic notification, which is sent at a predefined interval.

6. The method of claim 1, wherein:
   the feedback relates to one or more of the following:
      a change in confidence level for the identity of the user;
      a battery level for the portable electronic device;
      a usage pattern for the portable electronic device; and
      a received notification associated with the portable electronic device.

7. The method of claim 1, wherein the trigger event comprises a detected activity of the user determined from the collected sensor data.

8. The method of claim 1, wherein the trigger event comprises a notification that the portable electronic device has entered or exited a predefined region associated with a geofence.

9. The method of claim 1, wherein the trigger event comprises one or more of the following:
   a change in lighting;
   a change in sound;
   a change in magnetic field;
   a detected keyword;
   a detected near field communication (NFC) signal;
   a received message notification;
   a received telephone call;
   a user-interaction event associated with the portable electronic device;
   an interaction event between the portable electronic device and an external device/sensor;
   a screen-on event;
   a screen-off event;
   a device-unlock event;
   a device-unlock failure;
   an application-opening event;
   a switching-to-an-application event;
   a switching cell towers event;
   an install-application event;
   an uninstall-application event;
   a change in a device setting;
   a screen brightness adjustment; and
   a photograph-taking event.

10. The method of claim 1, wherein the one or more sensors include one or more of the following:
    an accelerometer;
    a touchscreen;
    a gyroscope;
    an inertial sensor;
    an ambient light sensor;
    an image sensor;
    a camera;
    an odor sensor;
    a temperature sensor;
    a barometric-pressure sensor;
    a cellular radio signal strength sensor;
    a Bluetooth radio signal strength sensor;
    a near-field communication (NFC) sensor;
    a network-proximity sensor;
    an infrared sensor;
    a magnetometer;
    a battery sensor;
    a force-touch measurement sensor;
    a multi-touch measurement sensor;
    a sensor in a mouse;
    a sensor in a trackpad; and
    a keyboard-timing sensor.

11. The method of claim 1 further comprising analyzing the feature vector to detect fraudulent activity.

12. The method of claim 1, wherein:
said identifying comprises identifying the user as a first authorized user; and
the method further comprises, after said identifying:
determining that the device is being used by a second user instead of the first authorized user; and
authenticating and/or identifying the second user in response to a second trigger event.

13. A non-transitory computer-readable storage medium storing instructions that when executed by a computer cause the computer to perform a method for authenticating and/or identifying a user of a portable electronic device, the method comprising:
in response to a trigger event, collecting sensor data from one or more sensors in the portable electronic device, wherein the sensor data includes movement-related sensor data caused by movement of the portable electronic device while the portable electronic device is in control of the user;
extracting a feature vector from the sensor data;
analyzing the feature vector using a model trained with sensor data previously obtained from the portable electronic device while the user was in control of the portable electronic device;
generating an associated security score for each of multiple authorized users of the device, based on said analysis of the feature vector; and
identifying the user based on the security scores;
wherein the trigger event comprises an adaptive notification sent at a variable interval determined based on feedback generated by a learner that processes the collected sensor data.

14. The non-transitory computer-readable storage medium of claim 13,
wherein the movement-related sensor data includes accelerometer data gathered while the user is walking; and
wherein the accelerometer data reflects a characteristic gait of the user while walking.

15. The non-transitory computer-readable storage medium of claim 13, wherein the trigger event comprises a silent push notification received by the portable electronic device.

16. The non-transitory computer-readable storage medium of claim 13, wherein the trigger event comprises a notification received by the portable electronic device from a wireless beacon.

17. The non-transitory computer-readable storage medium of claim 13, wherein the trigger event comprises a periodic notification, which is sent at a predefined interval.

18. The non-transitory computer-readable storage medium of claim 13, wherein:
the feedback relates to one or more of the following:
a change in confidence level for the identity of the user;
a battery level for the portable electronic device;
a usage pattern for the portable electronic device; and
a received notification associated with the portable electronic device.

19. The non-transitory computer-readable storage medium of claim 13, wherein the trigger event comprises a detected activity of the user determined from the collected sensor data.

20. The non-transitory computer-readable storage medium of claim 13, wherein the trigger event comprises a notification that the portable electronic device has entered or exited a predefined region associated with a geofence.

21. The non-transitory computer-readable storage medium of claim 13, wherein the trigger event comprises one or more of the following:
a change in lighting;
a change in sound;
a change in magnetic field;
a detected keyword;
a detected near field communication (NFC) signal;
a received message notification;
a received telephone call;
a user-interaction event associated with the portable electronic device;
an interaction event between the portable electronic device and an external device/sensor;
a screen-on event;
a screen-off event;
a device-unlock event;
a device-unlock failure;
an application-opening event;
a switching-to-an-application event;
a switching cell towers event;
an install-application event;
an uninstall-application event;
a change in a device setting;
a screen brightness adjustment; and
a photograph-taking event.

22. The non-transitory computer-readable storage medium of claim 13, wherein the method further comprising analyzing the feature vector to detect fraudulent activity.

23. A system that authenticates and/or identifies a user of a portable electronic device, comprising:
at least one processor and at least one associated memory; and
an authentication mechanism that executes on the at least one processor, wherein during operation, the authentication mechanism:
collects sensor data from one or more sensors in the portable electronic device in response to a trigger event, wherein the sensor data includes movement-related sensor data caused by movement of the portable electronic device while the portable electronic device is in control of the user;
extracts a feature vector from the sensor data;
analyzes the feature vector using a model trained with sensor data previously obtained from the portable electronic device while the user was in control of the portable electronic device;
generates an associated security score for each of multiple authorized users of the device, based on said analysis of the feature vector; and
identifies the user based on the security scores;
wherein the trigger event comprises an adaptive notification sent at a variable interval determined based on feedback generated by a learner that processes the collected sensor data.

24. The system of claim 23,
wherein the movement-related sensor data includes accelerometer data gathered while the user is walking; and
wherein the accelerometer data reflects a characteristic gait of the user while walking.

25. The system of claim 23, wherein the trigger event comprises a silent push notification received by the portable electronic device.

26. The system of claim 23, wherein the trigger event comprises a notification received by the portable electronic device from a wireless beacon.

27. The system of claim 23, wherein the trigger event comprises a periodic notification, which is sent at a predefined interval.

28. The system of claim 23, wherein:
the feedback relates to one or more of the following:
a change in confidence level for the identity of the user;
a battery level for the portable electronic device;
a usage pattern for the portable electronic device; and
a received notification associated with the portable electronic device.

29. The system of claim 23, wherein the trigger event comprises a detected activity of the user determined from the collected sensor data.

30. The system of claim 23, wherein the trigger event comprises a notification that the portable electronic device has entered or exited a predefined region associated with a geofence.

31. The system of claim 23, wherein the trigger event comprises one or more of the following:
a change in lighting;
a change in sound;
a change in magnetic field;
a detected keyword;
a detected near field communication (NFC) signal;
a received message notification;
a received telephone call;
a user-interaction event associated with the portable electronic device;
an interaction event between the portable electronic device and an external device/sensor;
a screen-on event;
a screen-off event;
a device-unlock event;
a device-unlock failure;
an application-opening event;
a switching-to-an-application event;
a switching cell towers event;
an install-application event;
an uninstall-application event;
a change in a device setting;
a screen brightness adjustment; and
a photograph-taking event.

32. The system of claim 23, wherein the authentication mechanism analyzes the feature vector to detect fraudulent activity.

33. A method for authenticating and/or identifying a user of a portable electronic device, the method comprising:
in response to each of multiple separate trigger events, collecting a set of sensor data from one or more sensors in the portable electronic device;
for each set of sensor data:
extracting a feature vector from the set of sensor data;
analyzing the feature vector using a model trained with sensor data previously obtained from the portable electronic device while the user was in control of the portable electronic device;
based on said analyzing, generating an associated security score for each of multiple types of device operations, including two or more of:
interaction between multiple devices in the vicinity of the user;
usage of a service by the user via the portable electronic device; and
one or more movements of the user while in control of the portable electronic device; and
authenticating and/or identifying the user based on the generated security scores;
wherein each trigger event comprises an adaptive notification sent at a variable interval determined based on a learner that processes the collected sensor data.

34. The method of claim 33, wherein said interaction between multiple devices in the vicinity of the user includes one or more of:
membership of the multiple devices in the same network;
one or more characteristics of signals emitted by the multiple devices;
a combination of audio data collected by microphones of the multiple devices;
collection of ambient light data from light sensors of the multiple devices; and
one or more indications that one of the multiple devices is paired with at least one other of the multiple devices.

35. The method of claim 33, wherein said usage of a service by the user via the portable electronic device includes one or more of:
a specific sequence of interactions with the service;
one or more mistakes performed by the user while using the service; and
behavior of the user in response to a display rendered by the service.

36. The method of claim 33, wherein said one or more movements of the user while in control of the portable electronic device includes one or more of:
standing up;
sitting down;
typing on a device other than the portable electronic device; and
talking directly to a person.

* * * * *